United States Patent [19]

Handly et al.

[11] 4,217,657
[45] Aug. 12, 1980

[54] FLOATING POINT ARITHMETIC CONTROL

[75] Inventors: Robert J. Handly; Robert H. Douglas, both of Phoenix, Ariz.

[73] Assignee: Honeywell Inc., Minneapolis, Minn.

[21] Appl. No.: 952,562

[22] Filed: Oct. 18, 1978

[51] Int. Cl.$^2$ ............................................. G06F 7/48
[52] U.S. Cl. ............................................. 364/748
[58] Field of Search ...................... 364/748, 200, 900

[56] References Cited

U.S. PATENT DOCUMENTS

| | | | |
|---|---|---|---|
| 3,829,673 | 8/1974 | Bouton, Jr. et al. | 364/748 |
| 3,871,578 | 3/1975 | Van De Goor et al. | 364/748 |
| 4,075,704 | 2/1978 | O'Leary | 364/748 |
| 4,079,455 | 3/1978 | Ozga | 364/200 |

*Primary Examiner*—David H. Malzahn
*Attorney, Agent, or Firm*—L. J. Marhoefer; Lockwood D. Burton

[57] ABSTRACT

An improved means and method for accomplishing floating point calculations in computational apparatus includes a primary microprocessor and a secondary microprocessor each with its own control ROM. The normal or fixed point calculations are handled by the primary microprocessor under the control of a first segment of the associated control ROM. When a floating point calculation is called for, a second segment of that ROM is addressed. The addressing of the second segment of the first ROM also effects the coincident addressing of the ROM of the secondary microprocessor. For floating point calculations, the exponent portion of the numbers being manipulated is handled in the primary microprocessor. Simultaneously therewith, the mantissa portion of the numbers being manipulated are handled in the secondary microprocessor under the control of its associated control ROM. The resultant calculations are recombined in the primary microprocessor to produce a complete solution for the floating point calculation.

6 Claims, 1 Drawing Figure

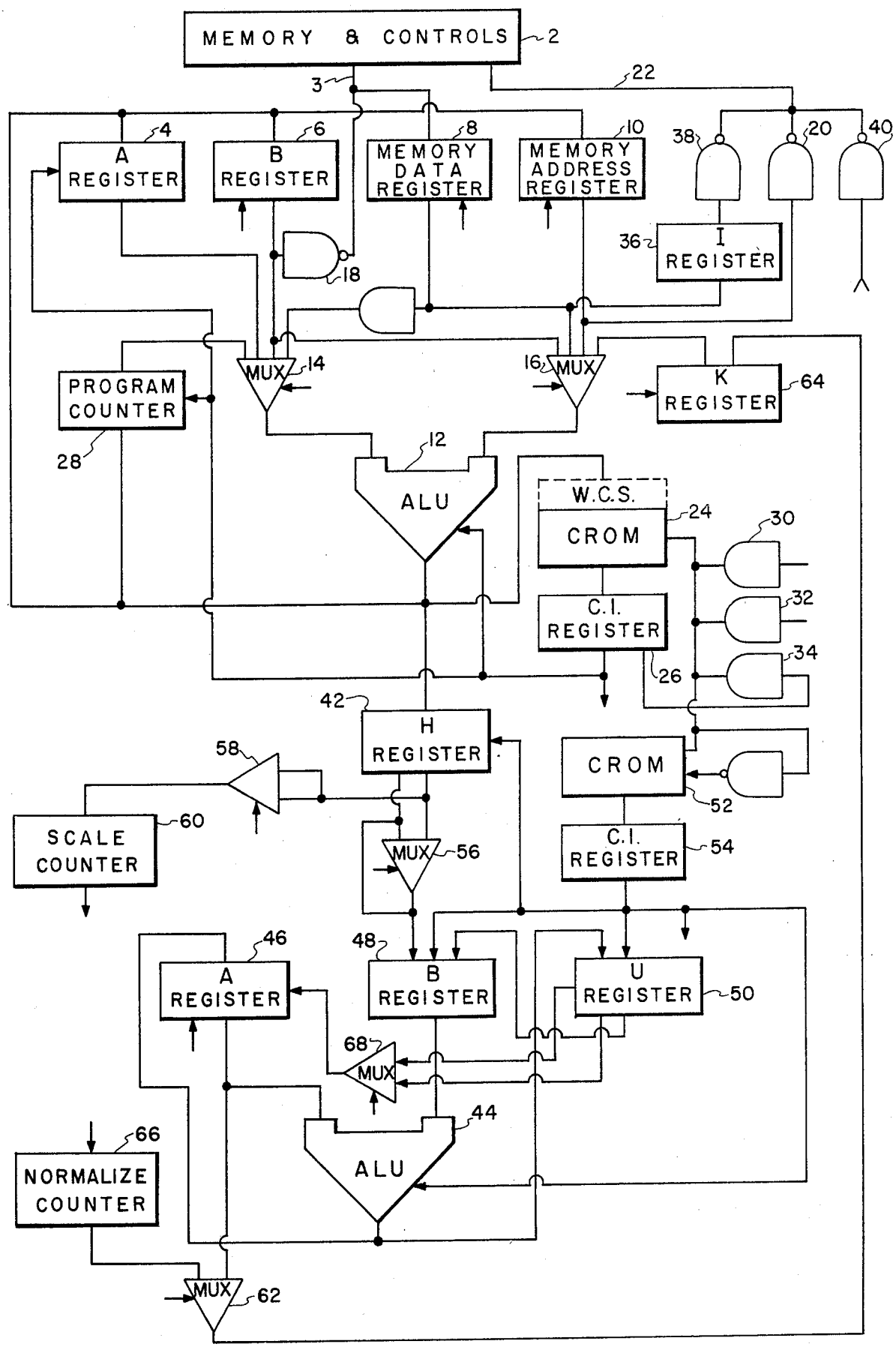

FLOATING POINT ARITHMETIC CONTROL

BACKGROUND OF THE INVENTION

The present invention relates to computer technology. More particularly, it relates to improved means and method for accomplishing floating point calculations in the computational operation of a computer.

In computer structures which have been provided heretofore, there has been provided a primary arithmetic unit, a memory unit, bus control units and input/output control units all tied together by a so-called CPU bus, a multiconductor bus in conventional architecture. In order to accomplish floating point capability, a separate arithmetic unit was added and tied into the system by way of the bus. That arrangement has the disadvantage of involving the bus control unit to determine the addressing of the floating point unit. Such an arrangement meant that the primary arithmetic unit was idled until the floating point unit had completed its manipulations. Such an arrangement unduly complicates the structure of the system and, of necessity, slows down the operation of the system.

SUMMARY OF THE INVENTION

It is, accordingly, an object of the present invention to provide an improved means and method for accomplishing floating point calculations which obviates the shortcomings of the previous systems.

In accomplishing this and other objects, there has been provided, in accordance with the present invention, an improved computational apparatus wherein a central processing unit has the usual complement of a memory and a bus control, an arithmetic logic unit with its associated registers, a control ROM with its associated control instruction register. There is provided an additional arithmetic logic unit having its associated registers and a control ROM with its associated control instruction register. The second ALU is connected as an adjunct to the primary ALU and does not communicate therewith by way of the CPU bus but is rather internally connected as an extension of the primary ALU. The control ROM of the primary ALU is divided into two segments, the first segment is devoted to the normal or fixed point operation of the primary ALU. The second segment is devoted to the operation of the floating point calculations. The control ROM of the auxiliary ALU is addressed only when the second segment of the primary control ROM is addressed and is constructed as a bit extension to increase the effective word length of the locations in the second segment of the primary control ROM. When the computer is operating in its normal mode and there arises an occasion for the handling of a floating point calculation, the second segment of the control ROM of the primary ALU and, hence, the control ROM of the auxiliary ALU is addressed. The mathematical values to be manipulated in accordance with the floating point calculations is expressed in terms of so-called scientific notation, that is, $m \times 2^n$. The exponent portions of the calculation is processed by the primary ALU while the mantissa of the mathematical expression is manipulated in the auxiliary ALU, both operations being carried out simultaneously. The result of the two manipulations is then recombined in the primary ALU with the output thereof stored in a suitable register.

BRIEF DESCRIPTION OF THE DRAWING

A better understanding of the invention may be had from the following detailed description when read in the light of the accompanying drawing in which:

The single FIGURE is a schematic logic block diagram of a portion of a computer system embodying the present invention.

DETAILED DESCRIPTION

Referring now to the drawing in more detail, there is shown in the single FIGURE, in block diagram form, a portion of a computer system including a memory and control unit 2 which includes the main memory of the computer. The memory and control unit 2 is connected by a suitable memory data bus means 3 to the operating portions of the computational network. These include an A register 4, a B register 6, a Memory Data register 8, and a Memory Address register 10. An arithmetic logic unit 12 has an output connected to the input of the A register 4, the B register 6 and the Memory Address register 10. The output of the A register 4 is connected through a first multiplexer 14 to one input of the arithmetic logic unit (ALU) 12. The output of the B register 6 is also connected through the multiplexer 14 to the first input of the ALU 12. An output from the program counter 28 is applied to the input of the first multiplexer 14. The output of the B register 6 is further applied to one input means of a second multiplexer 16, the output of which is connected to the second input of the ALU 12. The output of the B register 6 is also connected, through an inverter means 18, to the memory data bus 3 connected to the memory and control unit 2. The Memory Data register 8 has its input directly connected to the memory data bus 3 and its output connected to the input of the second multiplexer 16. The Memory Address register 10 has its output connected to the input of the multiplexer 16 and to the input of the memory address gating means 20. The output of the memory address gating means 20 is connected to the memory address bus 22.

A control ROM 24 has an output connected to a Control Instruction register 26, the Control Instruction register 26 has output connections to control the operation of the ALU 12, the A register 4, the B register 6, the Memory Data register 8, and the Memory Address register 10. The control ROM 24, in an exemplary embodiment constructed in accordance with the present invention, is a memory unit with 1,536 addressable words, each of 48 bits in length. The first 1,024 of the control words in the control ROM 24 are used for the normal operation of the ALU 12 and its associated components. The next 512 control words of the control ROM 24 are devoted to floating point calculations.

The control ROM 24 also includes a writable control storage which has an input connected to the output of the ALU 12. The output of the ALU 12 is connected to a program counter 28 which is also operated under controlled instructions from the output of the Control Instruction register 26. A gating assembly, including a first gate means 30, a second gate means 32, and a third gate means 34, is connected to input control for the control ROM 24. The gating means 30 receives signals from the Memory Address register 10, the gating means 32 receives signals from the Memory Data register 8 and the gating means 34 receives sequencing signals from the Control Instruction register 26. The output of the gating structure is the address applied to the control ROMS 24 and 52.

The output of the Memory Data register 8 is also connected through an I register 36, thence through a gating means 38, to the memory address bus 22. A third gating means 40 receives an input signal from the Control Instruction register 26. The output of the gating means 40 is also connected to the memory address bus 22.

An output from the ALU 12 is connected as input to an H register 42 which is an input register for a second microprocessor circuit. The second microprocessor circuit includes a second or auxiliary ALU 44. An A register 46 has an output connected to one of the inputs of the ALU 44. A B register 48 has its output connected to the other input of the ALU 44. A U register 50 has an input connected to the output of the ALU 44. A control ROM 52 has an address input connected in parallel with the address input of control ROM 24. The control ROM 52 has an output connected to a control instruction register 54. The output of the control instruction register 54 is connected to effect control over the A register 46, the B register 48, the U register 50 and the ALU 44. Additionally, the output of the control instruction register 54 is effective to control the operation of the H register 42. The output of the H register 42 is connected through a multiplexer 56 to the input of the B register 48. The output of the H register 42 is also connected through a buffer 58 to a scale counter 60. The scale counter 60 controls the scaling of the quantities in the auxiliary microprocessor in the performance of the manipulation of the quantities.

The output of the A register 46 is also applied to the input of a multiplexer 62 the output of which is connected to an input of a K register 64 in the primary microprocessor unit. The output of the K register is applied to the input of the multiplexer 16. The K register 64 is also operated under control of the output of the Control Instruction register 26.

A Normalize counter 66 is operated under the control of the output of the Control Instruction register 54 and has an output connected to the input of the multiplexer 62.

The U register has a first and a second output terminal both of which are connected to the input terminals of a multiplexer 68. The output of the multiplexer 68 is connected as an input to the A register 46. Additionally, the U register has an output which is connected to the input of the B register 48.

In the operation of the system, the primary ALU 12 with its associated components performs the normal operations of the ALU in a conventional manner. Those operations are under the control of the first 1,024 words in the control ROM 24. When, however, an operation is called for in the course of carrying out a programmed series of steps which requires a floating point manipulation, the remaining 512 words of the control ROM 24 are addressed. With the interconnection of the control ROM 24 and the control ROM 52, the addressing of the upper 512 words of the control ROM 24 addresses the corresponding 512 words of the control ROM 52. As was noted before, each of the addressable words in the control ROM 24, in the exemplary embodiment, is 48 bits in length. Similarly, each of the addressable words is the control ROM 52 is 16 bits in length.

Under the control of these two control ROMS, and with the values they manipulated expressed in terms of scientific notation, the exponent portion of those numbers or values is controlled to be manipulate in the ALU 12 while the mantissa portion of the numbers is manipulated in the ALU 44. The actual numbers to be manipulated by the ALU 44 are translated from the output of the ALU 12 to the H register 42 into the B register 48 with a first number being transferred through the ALU to the A register while the second number to be manipulated is stored in the B register. The manipulated control of the numbers in the ALU 44 is in accordance with the control instructions stored in the control ROM 52. The resultant manipulation of the numbers by the ALU 44 is stored in the U register 50.

The two output leads from the U register connected to the input of the multiplexer 68 are individually connected to individual segments of the U register and are coupled into the A register 46 for recognition of the type of digital bits stored in those two segments of the U register. The output lead from the U register to the B register transfers the entire content of the U register in parallel into the B register, again under the control of instructions from the control ROM 52 through the control instruction register 54. When the manipulation in the ALU 44 has been completed, the manipulated mantissa is stored in the A register 46.

While the mantissas were being manipulated in the ALU 44, the exponents of the numbers were simultaneously being manipulated in the ALU 12. When the manipulation of the exponent portion of the numbers is completed in the ALU 12, the completed manipulation of the mantissa in the A register 46 is transmitted through the multiplexer 62 to the input of the K register. The output of the K register 64 is applied through a multiplexer 16 to the second input of the ALU 12; the manipulated exponent portion of the numbers will be applied from the A register 4 to the multiplexer 14 to the first input of the ALU 12 where the two numbers are combined into a composite number. The resulting composited number may then be stored in either the A register 4 or the B register 6 depending on whether the number is to be used as a part of another manipulation or to be stored in the main memory.

Thus it may be seen that there has been provided, in accordance with the present invention, an improved computational structure for the manipulation of numbers to provide floating point calculations. The combination includes a primary arithmetic logic unit with its associated controls and registers and an auxiliary arithmetic logic unit with its associated controls and registers wherein the primary arithmetic logic unit manipulates the exponent portion of the calculation involving floating point values simultaneously with the manipulation by the auxiliary ALU of the mantissa portion of a calculation involving floating point values.

The embodiments of the invention is which an exclusive property or privilege is claimed are defined as follows:

1. Computational apparatus for effecting floating point calculations comprising:
   a first microprocessor including a first arithmetic logic unit and a first control ROM;
   said first control ROM including a first segment having a first number of addressable words for the control of said first microprocessor during fixed point calculations, and a second segment having a second number of addressable words for the control of said first microprocessor during floating point calculations;

means for addressing said first segment of said first control ROM for said fixed point calculations and for addressing said second segment of said ROM for said floating point calculations;

a second microprocessor having a second arithmetic logic unit and a second control ROM;

said second control ROM having a number of addressable control words which corresponds to the number of control words in said second segment of said first control ROM for the control of said second microprocessor during said floating point calculations; and means for addressing said second control ROM coincidently with the addressing of said second segment of said first control ROM;

interconnection means between said first and second microprocessor so interconnecting said first and second microprocessors that a first portion of said values being manipulated in a floating point calculation are manipulated by said first microprocessor simultaneously with the manipulation of a second portion of said values by said second microprocessor.

2. The computational apparatus as set forth in claim 1 wherein, with said values being expressed in scientific notation, said first portion of said values manipulated by said first microprocessor comprises the exponent portion and said second portion of said values manipulated by said second microprocessor comprises the mantissa portion.

3. The computational apparatus as set forth in claim 2 wherein said second microprocessor has an output means connected to an input means of said first microprocessor to return the manipulated mantissa portion of said values to said first microprocessor for recombination with the manipulated exponent portion of said values to provide a composite result.

4. The computational apparatus as set forth in claim 2 wherein the interconnection between said first and second microprocessors includes an output connection from said first arithmetic logic unit to the input of said second microprocessor for the transfer of mantissa values to said second microprocessor for manipulation thereby.

5. The computational apparatus as set forth in claim 4 wherein interconnection means are provided between said means for addressing first control ROM and said means for addressing second control ROM to effect the addressing of said second ROM whenever said second segment of said first ROM is addressed.

6. The method of effecting floating point calculations in a computational apparatus having a first and a second microprocessor unit, said method comprising:

manipulating the exponent portion of values in said first microprocessor unit, simultaneously therewith, manipulating the mantissa portion of the values in said second microprocessor unit, and recombining the manipulated maintissa portion from said second microprocessor unit with the manipulated exponent portion in said first microprocessor unit to provide a composite result.

* * * * *